(12) United States Patent
Kasamatsu et al.

(10) Patent No.: US 10,155,895 B2
(45) Date of Patent: Dec. 18, 2018

(54) COMPOSITE HEAT STORAGE MATERIAL

(71) Applicant: DENSO CORPORATION, Kariya, Aichi-pref. (JP)

(72) Inventors: Shinya Kasamatsu, Kariya (JP); Eiichi Okuno, Kariya (JP); Yasushi Kono, Kariya (JP); Takuya Fuse, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/510,805

(22) PCT Filed: Oct. 8, 2015

(86) PCT No.: PCT/JP2015/005113
§ 371 (c)(1),
(2) Date: Mar. 13, 2017

(87) PCT Pub. No.: WO2016/063478
PCT Pub. Date: Apr. 28, 2016

(65) Prior Publication Data
US 2017/0298262 A1    Oct. 19, 2017

(30) Foreign Application Priority Data

Oct. 22, 2014 (JP) .................. 2014-214973

(51) Int. Cl.
*C09K 5/02* (2006.01)
*C09K 5/14* (2006.01)
(Continued)

(52) U.S. Cl.
CPC ............ *C09K 5/14* (2013.01); *B01D 53/92* (2013.01); *C09K 5/02* (2013.01); *F01N 3/0222* (2013.01); *F01N 3/2842* (2013.01)

(58) Field of Classification Search
CPC ........................................... C09K 5/14
(Continued)

(56) References Cited

U.S. PATENT DOCUMENTS

| 4,873,038 A | * | 10/1989 | Rapp | ............... C04B 35/65 165/10 |
| 5,178,875 A | * | 1/1993 | Lenk | ............... A61K 9/1277 264/4.1 |

(Continued)

FOREIGN PATENT DOCUMENTS

| JP | 05-320629 A | 12/1993 |
| JP | 2005-134101 A | 5/2005 |

(Continued)

OTHER PUBLICATIONS

Machine Translation of JP 2010163510 A to Miyano et al., published Jul. 2010 (Year: 2010).*

(Continued)

*Primary Examiner* — Jane L Stanley
(74) *Attorney, Agent, or Firm* — Posz Law Group, PLC

(57) ABSTRACT

A composite heat storage material includes a heat storage material and an inorganic material. The heat storage material is made of a strongly correlated electron material that stores and dissipates heat via solid-solid phase transition. The inorganic material is different from the material of the heat storage material. The heat storage material and the inorganic material are mixed. The composite heat storage material can have characteristics of both the heat storage material and the inorganic material.

11 Claims, 4 Drawing Sheets

(51) Int. Cl.
*B01D 53/92* (2006.01)
*F01N 3/022* (2006.01)
*F01N 3/28* (2006.01)

(58) Field of Classification Search
USPC .......................................................... 252/71
See application file for complete search history.

(56) References Cited

U.S. PATENT DOCUMENTS

| | | | | |
|---|---|---|---|---|
| 5,413,649 | A * | 5/1995 | Dunand | C21D 8/00 148/564 |
| 5,641,424 | A * | 6/1997 | Ziolo | B82Y 25/00 252/62.51 R |
| 6,200,631 | B1 * | 3/2001 | Kobayashi | C03B 5/43 264/30 |
| 8,840,803 | B2 * | 9/2014 | Mazyar | E21B 43/128 165/104.11 |
| 10,030,186 | B2 * | 7/2018 | Chan | C09K 5/04 |
| 2002/0016505 | A1 | 2/2002 | Gally et al. | |
| 2007/0262408 | A1 * | 11/2007 | Takagi | H01C 7/008 257/467 |
| 2011/0139208 | A1 * | 6/2011 | Lee | C09K 5/14 136/236.1 |
| 2011/0300421 | A1 | 12/2011 | Iritani et al. | |
| 2012/0042687 | A1 | 2/2012 | Kamoshida et al. | |
| 2012/0305213 | A1 | 12/2012 | Tsukahara et al. | |
| 2016/0130492 | A1 | 5/2016 | Matsumura et al. | |

FOREIGN PATENT DOCUMENTS

| | | |
|---|---|---|
| JP | 2006-063314 A | 3/2006 |
| JP | 2009-024086 A | 2/2009 |
| JP | 2010-163510 A | 7/2010 |
| JP | 2011-127832 A | 6/2011 |
| JP | 2012-102264 A | 5/2012 |
| JP | 2013-013844 A | 1/2013 |
| JP | 2013-129828 A | 7/2013 |
| JP | 2013-200073 A | 10/2013 |
| JP | 2014-091759 A | 5/2014 |
| WO | 2012/176708 A1 | 12/2012 |
| WO | 2014/068628 A1 | 5/2014 |

OTHER PUBLICATIONS

A. Callaghan et al., "Magnetic Properties of $V_2O_3$—$Al_2O_3$ Solid Solutions" Transactions of the Faraday Society, vol. 62, Jan. 1, 1966, pp. 3463-3469, XP055407240.

B. Koscielska et al., "Superconducting Properties of VN-$SiO_2$ Sol-Gel Derived Thin Films" Oct. 1, 2011, XP055407274.

* cited by examiner

COMPOSITE HEAT STORAGE MATERIAL

CROSS REFERENCE TO RELATED APPLICATIONS

This application is a U.S. national stage of International Patent Application No. PCT/JP2015/005113 filed on Oct. 8, 2015 and is based on Japanese Patent Application No. 2014-214973 filed on Oct. 22, 2014, the disclosures of which are incorporated herein by reference.

TECHNICAL FIELD

The present disclosure relates to a composite heat storage material including a primary member, and a dispersion member dispersed in the primary member.

BACKGROUND ART

A heat storage material is used as one of means for heating or cooling in various usages. Such heat storage material is disclosed in Patent Document 1, for example. In Patent Document 1, a heat storage material that is made of strongly correlated electron material storing and dissipating heat via solid-solid phase transition. The heat storage material is capable of storing and dissipating heat by using a phase transition enthalpy generated via transformation of a crystal structure occurring during solid-solid phase transition.

When a heat storage structure is constructed from the heat storage material, it may be difficult to secure enough strength. Especially, when used for obtaining the heat storage structure that stores and dissipates heat at a desired temperature, the material may be limited to a strongly correlated electron material having a phase transition temperature corresponding to the desired temperature. Accordingly, characteristics of the strongly correlated electron material may be limited, and a desired strength may not be obtained.

PRIOR ART DOCUMENT

Patent Document

Patent Document 1: Japanese Patent No. 2010-163510 A

SUMMARY OF THE INVENTION

In consideration of the above-described points, it is an objective of the present disclosure to provide a composite heat storage material having a desired heat storage property and a desired strength.

According to an aspect of a composite heat storage material of the present disclosure, a heat storage material made of a strongly correlated electron material that stores and dissipates heat via solid-solid phase transition and an inorganic material different from the heat storage material are mixed.

EMBODIMENTS FOR EXPLOITATION OF THE INVENTION

According to the aspect of the present disclosure, in the composite heat storage material, the heat storage material that stores and dissipates heat via solid-solid phase transition and the inorganic material different from the heat storage material are mixed.

In the composite heat storage material, the inorganic material may be used as a primary member, the heat storage material may be used as a dispersion member, and the heat storage material may be mixed and dispersed in the inorganic material. In this case, since the inorganic material that is the primary member can be selected without being limited by a desired heat storage property, the composite heat storage material can easily have a desired strength. Therefore, enough strength to form various structures can be given to the composite heat storage material.

The heat storage material may be made of a material that changes phases between a metal phase and an insulator. A metal-insulator transition material has a phase transition enthalpy larger than that of general solid-solid phase transition materials. Therefore, a heat storage amount of the heat storage material can be increased.

The inorganic material may be the strongly correlated electron material that stores and dissipates heat via solid-solid phase transition. In this case, a heat storage amount of the composite heat storage material can be increased by using the inorganic material as the heat storage material.

First Embodiment

Figure 1:
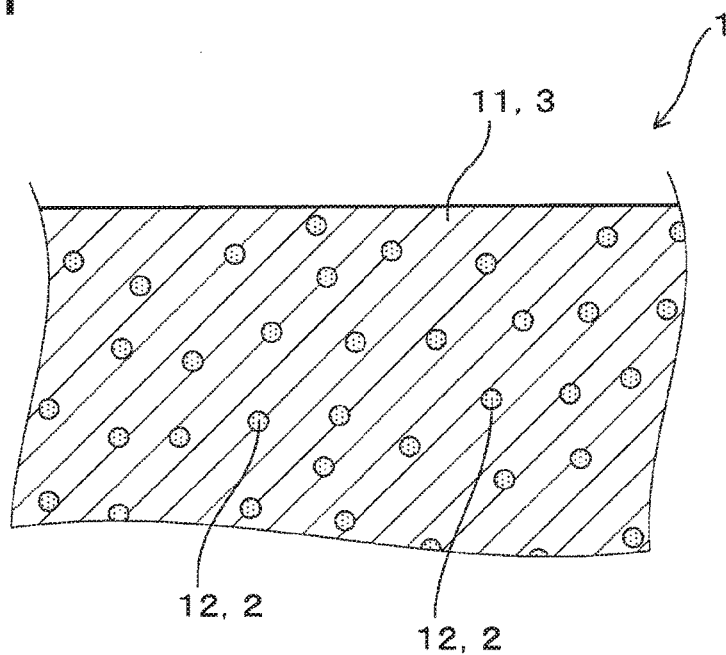
FIG. 1 is a sectional view illustrating a part of a composite heat storage material according to a first embodiment of the present disclosure.
Figure 2:
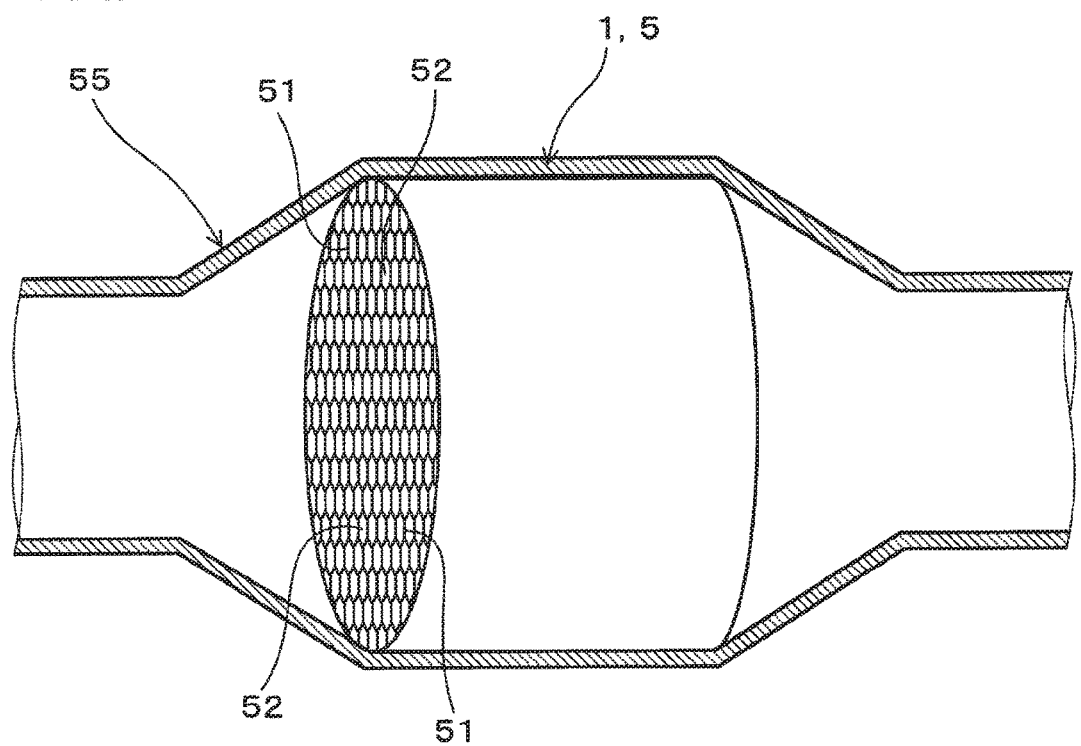
FIG. 2 is a diagram illustrating a honeycomb structure according to the first embodiment.
Figure 3:
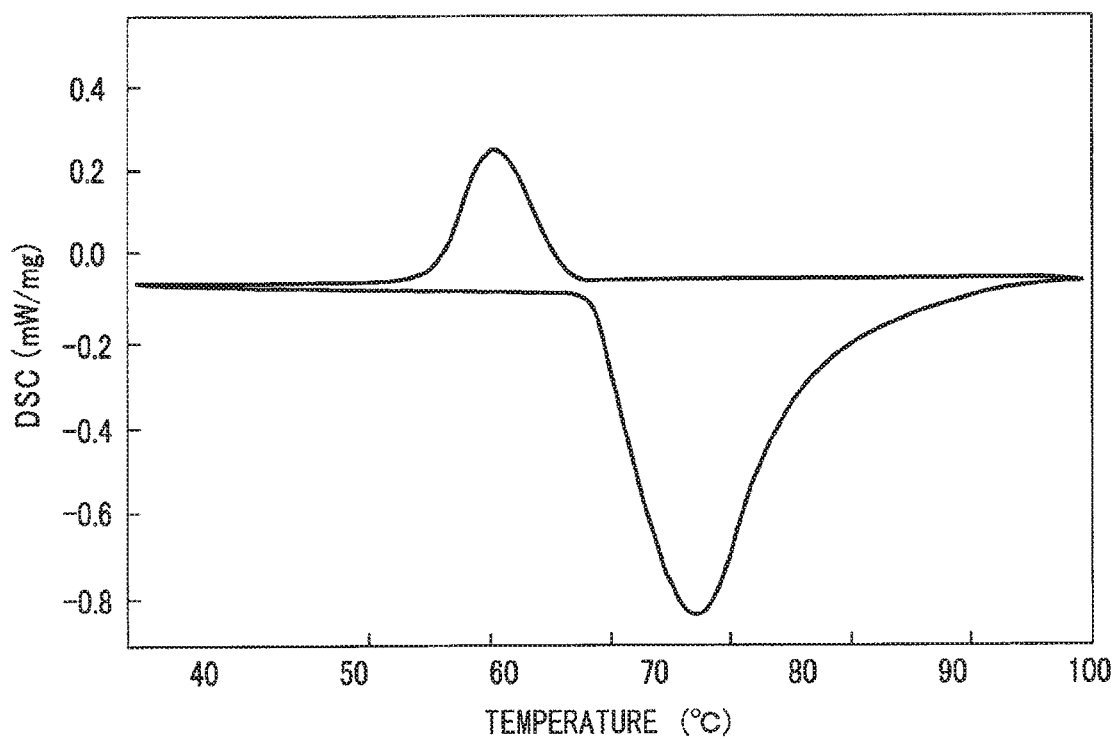
FIG. 3 is a diagram illustrating a relationship between a heat storage amount and a temperature of a vanadium dioxide.

An embodiment of a composite heat storage material is described referring to FIGS. 1 to 3. As shown in FIG. 1, a composite heat storage material 1 is made by mixing a heat storage material 2 and an inorganic material 3 different from the heat storage material 2. The heat storage material 2 is made of a strongly correlated electron material that stores and dissipates heat via solid-solid phase transition.

More details are described below. As shown in FIG. 2, the composite heat storage material 1 of the present embodiment is used as a material of a honeycomb structure 5 that purifies an exhaust gas generated in an engine of a vehicle. The honeycomb structure 5 is disposed in an exhaust gas pipe 55 in which the exhaust gas flows. The honeycomb structure 5 has an approximately circular column shape, and includes multiple cell walls 51 and multiple cell holes 52 penetrating the honeycomb structure 5 in an axial direction. The cell hole 52 is defined by the cell wall 51.

The composite heat storage material 1 includes a primary member 11 that is the inorganic material 3 made of ceramic, and a dispersion member 12 that is the heat storage material 2. The heat storage material 2 is mixed and dispersed in the inorganic material 3. A ceramic such as $Al_2O_3$ (aluminum oxide), AlN (aluminum nitride), or $Si_3N_4$ (silicon nitride) is used as the inorganic material of the primary member 11.

The heat storage material 2 that is the dispersion member 12 is mixed and dispersed in a whole of the inorganic material 3 approximately uniformly. The heat storage material 2 is made of $VO_2$ (vanadium dioxide) that is a strongly correlated electron material storing and dissipating heat via solid-solid phase transition, and the heat storage material 2 has a particulate shape that has an approximately sphere shape with approximately 10 mm diameter. $VO_2$ is an oxide of a transition metal including V (vanadium) that is a transition metal, and a phase transition temperature of $VO_2$ is approximately 68° C. $VO_2$ is a metal-insulator transition material. $VO_2$ is in metal phase at or above the phase transition temperature and stores heat, and $VO_2$ is in insulation phase at or below the phase transition temperature and dissipates heat.

The strongly correlated electron material that stores and dissipates heat via solid-solid phase transition stores and dissipates heat by using a phase transition enthalpy generated by transformation of a crystal structure via solid-solid phase transition. At this time, spin and orbital ordering also occurs, and heat storage and heat dissipation occur by using an enthalpy change caused by the spin and orbital ordering.

A vanadium oxide such as $VO_2$ or $V_2O_3$, or $NaNiO_2$, $PrBaCo_2O_{5.5}$, $DyBaCo_2O_{5.5}$, $LiMn_2O_4$, $HoBaFe_2O_5$, $DyBaFe_2O_5$, $GdBaFe_2O_5$, $EuBaFe_2O_5$, $SmBaFe_2O_5$, $TbBaFe_2O_5$ or $LiRh_2O_4$ can be used as the strongly correlated electron material that stores and dissipates heat via solid-solid phase transition. The vanadium oxide may be doped with W, Nb, Ta or Mo.

Next, effects of the present embodiment are described below. Since the composite heat storage material 1 is made by mixing and dispersing the heat storage material 2 in the inorganic material 3, the inorganic material 3 works as a reinforcement material of the heat storage material 2, and accordingly a strength of the composite heat storage material 1 can be improved. Therefore, the composite heat storage material 1 that is capable of storing and dissipating heat at a desired temperature and has a desired strength can be obtained.

The desired temperature for storing and dissipating heat and a desired heat storage amount can be obtained by adjusting a material and a ratio of the heat storage material 2. The desired strength can be obtained by adjusting a material and a ratio of the inorganic material 3.

The inorganic material 3 is used as the primary member 11, and the heat storage material 2 is used as the dispersion member 12. The heat storage material 2 is mixed and dispersed in the inorganic material 3. In this case, since the inorganic material 3 that is the primary member 11 can be selected without sacrificing a desired heat storage property of the composite heat storage material 1, the desired strength of the composite heat storage material 1 can be easily obtained. Accordingly, the composite heat storage material 1 can have a strength enough to form a variety of structures.

The heat storage material 2 is made of the metal-insulator transition material that changes phases between a metal phase and an insulator phase. The metal-insulator transition material has a phase transition enthalpy larger than that of a typical solid-solid phase transition material. Accordingly, a heat storage amount of the heat storage material 2 can be increased.

As described above, the composite heat storage material 1 having desired heat storage property and desired strength can be provided according to the present embodiment.

Second Embodiment

Figure 4:
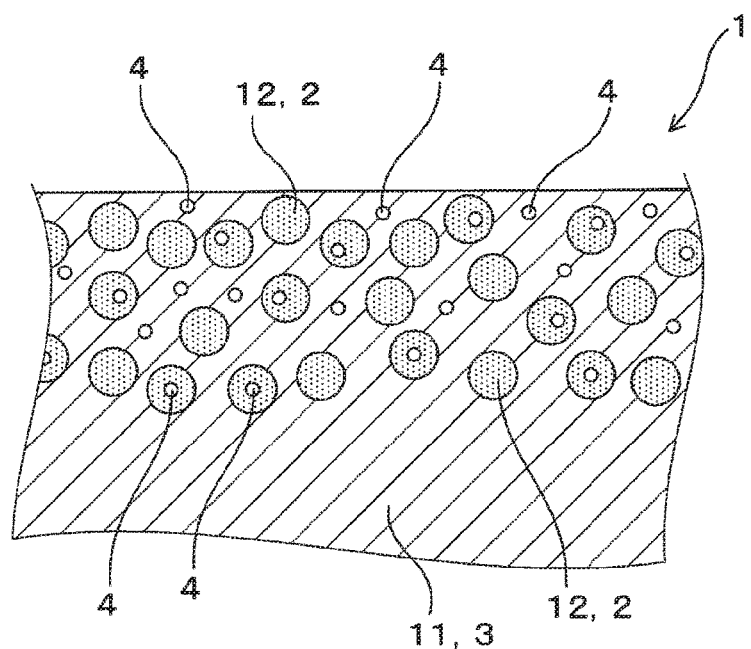
FIG. 4 is a sectional view illustrating a part of a composite heat storage material according to a second embodiment of the present disclosure.

In the present embodiment, configurations of a composite heat storage material 1 of the first embodiment are partially changed, as shown in FIG. 4. In the composite heat storage material 1 of the present embodiment, a heat storage material 2 is mixed and dispersed in a ceramic that is an inorganic material 3. The heat storage member 2 is disposed near a surface of a honeycomb structure 5. Moreover, an air space 4 is provided in the inorganic material 3 and a part of the heat storage material 2.

Configurations of the other part are the same as the first embodiment. In reference numerals that are used in descriptions and drawings of the present embodiment, the same reference numerals as the first embodiment represent similar components to the first embodiment unless described otherwise.

In the composite heat storage material 1 of the present embodiment, since the heat storage material 2 is dispersed so as to be located near the surface of the honeycomb structure 5, the heat storage material 2 is capable of storing and dissipating heat quickly. Accordingly, the heat can be effectively stored in the heat storage material 2, and an amount of heat dissipated from the heat storage material 2 per time can be increased.

Moreover, since moisture included in an exhaust gas enters the air space 4 provided in the inorganic material 3 and the heat storage material 2, a heat storage and a heat dissipation of the moisture can be utilized. Therefore, a total amount of heat stored in the composite heat storage material 1 can be increased. The air space 4 may be provided in at least one of the inorganic material 3 and the heat storage material 2. For example, the air space 4 may be provided in the inorganic material 3, and the air space 4 may not be provided in the heat storage material 2. The air space 4 may be provided in the heat storage material 2, and the air space 4 may not be provided in the inorganic material 3. In the present embodiment, same effects as the first embodiment can be obtained.

In the first embodiment and the second embodiment, the composite heat storage material 1 is used as a material of the honeycomb structure 5 used in a vehicle. However, the composite heat storage material 1 can be used for various purposes. For example, specifically, when the inorganic material 3 is used as diatomaceous earth used for a wall or the like of a building, and when the heat storage material 2 is mixed and dispersed in the inorganic material 3, the composite heat storage material 1 for building can be obtained. In this case, an amount of energy for air conditioning of the building can be reduced. When asphalt used for road is used as the inorganic material 3, and when the heat storage material 2 is mixed and dispersed in the inorganic material 3, the composite heat storage material 1 for road can be obtained. In this case, since the heat storage material 2 dissipates heat during a low temperature, a road surface freezing can be prevented.

The inorganic material 3 includes various inorganic substances such as metal, ceramic, and carbon material. The carbon material may be carbon nanotube, fullerene, graphene, graphite or the like.

Third Embodiment

Figure 5:
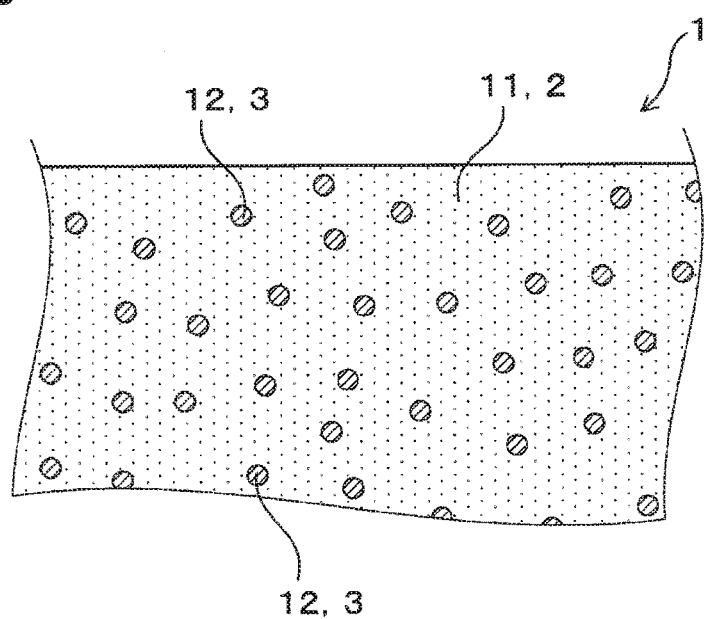
FIG. 5 is a sectional view illustrating a part of a composite heat storage material according to a third embodiment of the present disclosure.
Figure 6:
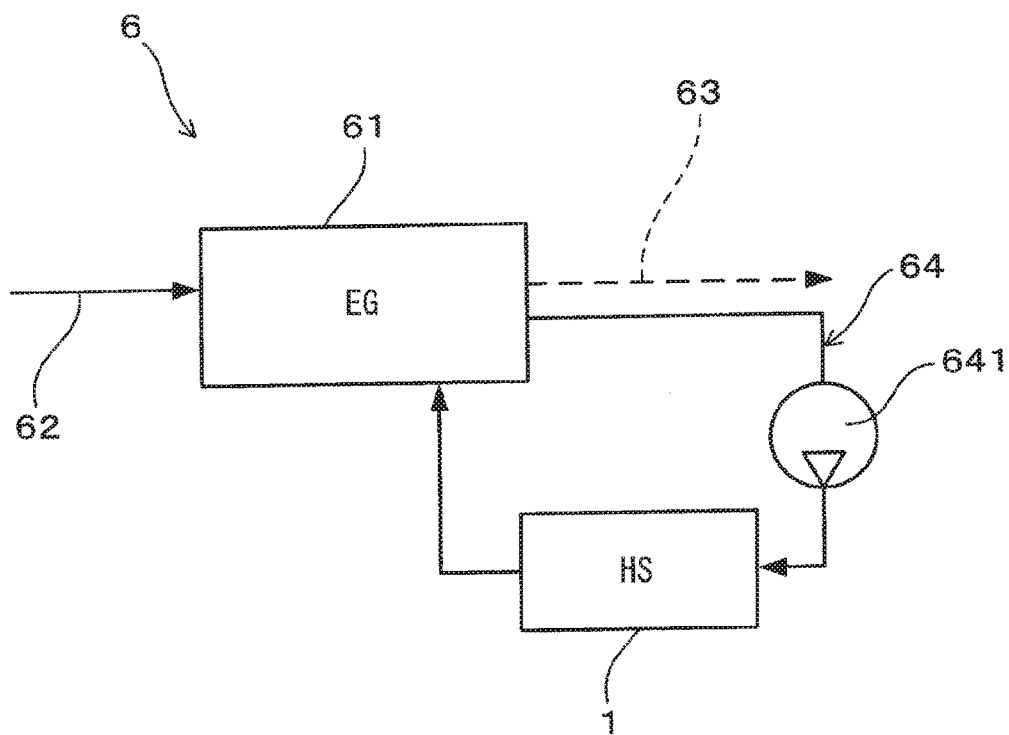
FIG. 6 is a schematic diagram illustrating a heat storage system according to the third embodiment.

As shown in FIGS. 5 and 6, in the present embodiment, configurations of a composite heat storage material 1 (HS)

of the first embodiment are changed. As shown in FIG. 6, the composite heat storage material 1 is used in a heat storage system 6 which stores heat by using exhaust heat of an internal combustion engine (EG) 61 that is one of a driving source for travelling of a hybrid vehicle.

The heat storage system 6 is configured to transfer heat of the internal combustion engine 61 to the composite heat storage material 1 through a cooling water, and the heat storage system 6 is configured to store the heat in the composite heat storage material 1. The internal combustion engine 61 converts a thermal energy generated by combusting a fuel 62 to a driving energy. A part of the thermal energy is discharged to an exhaust gas pipe as an exhaust heat along with an exhaust gas 63 of the internal combustion engine.

The internal combustion engine 61 and the composite heat storage material 1 are connected to each other by a cooling water passage 64 that forms a closed circuit between the internal combustion engine 61 and the composite heat storage material 1. A pump 641 circulating a cooling water in the cooling water passage 64 is provided in the cooling water passage 64. The cooling water in the cooling water passage 64 flows from a cooling water outlet of the internal combustion engine to a cooling water inlet of the internal combustion engine via a heat storage portion. The cooling water passage 64 is arranged so as to perform a heat exchange between the cooling water and the exhaust gas 63 flowing in the exhaust gas pipe. The cooling water passage 64 is arranged so as to perform a heat exchange between the cooling water and the composite heat storage material 1. The cooling water is heated to high temperature due to the heat exchange between the internal combustion engine 61 or the exhaust gas 63 and the cooling water. The heat can be stored in the composite heat storage material 1 by the heat exchange between the composite heat storage material 1 and the cooling water heated to the high temperature. The heat stored in the composite heat storage material 1 can be used for heating an conditioning air, for example.

As shown in FIG. 5, the composite heat storage material 1 of the present embodiment includes the primary member 11 made of heat storage material 2 that is the strongly correlated electron material heating and dissipating heat via solid-solid phase transition, and the dispersion member 12 made of inorganic material 3. The heat storage material 2 is made of $VO_2$.

The inorganic material 3 used as the dispersion member 12 is made of metal having a high thermal conductivity such as Al or Cu. Since the metal having a high thermal conductivity is dispersed in the composite heat storage material 1, a thermal conductivity of the composite heat storage material 1 can be improved, and accordingly a heat storage property and a heat dissipation property of the composite heat storage material 1 can be improved.

The other configurations are the same as the first embodiment. In reference numerals that are used in descriptions and drawings of the present embodiment, the same reference numerals as the first embodiment represent similar components to the first embodiment unless described otherwise.

Since the heat storage material 2 is used as the primary member 11, and since the inorganic material 3 is used as the dispersion member 12, characteristics of the inorganic material 3 can be added to the heat storage material 2. For example, when the inorganic material 3 having a high thermal conductivity is mixed and dispersed in the heat storage material 2, the composite heat storage material 1 superior in heat storage property can be obtained. When the inorganic material 3 superior in strength is mixed and dispersed in the heat storage material 2, the composite heat storage material 1 superior in strength can be obtained.

Fourth Embodiment

Figure 7:
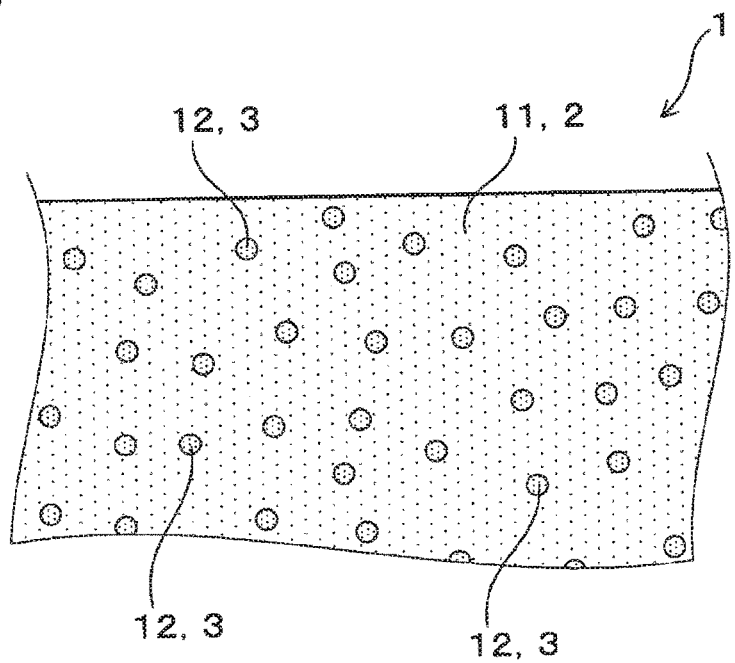
FIG. 7 is a sectional view illustrating a part of a composite heat storage material according to a fourth embodiment of the present disclosure.

In the present embodiment, as shown in FIG. 7, a part of configurations of a composite heat storage material 1 according to the third embodiment is changed. In the composite heat storage material 1 of the present embodiment, a heat storage material 2 that is a primary member 11 is made of $VO_2$. An inorganic material 3 that is a dispersion member 12 is made of a strongly correlated electron material storing and dissipating heat via solid-solid phase transition. The dispersion member 12 is made of $V_2O_3$ (vanadium trioxide). The $V_2O_3$ is a transition metal oxide including V that is a transition metal. A phase transition temperature of $V_2O_3$ is −119° C. $V_2O_3$ is a metal-insulator transition material that is in solid phase at or above the transition temperature and stores heat $V_2O_3$ is a metal-insulator transition material that is in insulator phase at or below the phase transition temperature and dissipates heat.

The other configurations are same as the first embodiment. In reference numerals that are used in descriptions and drawings of the present embodiment, the same reference numerals as the first embodiment represent similar components to the first embodiment unless described otherwise.

In the present embodiment, since both the inorganic material 3 and the heat storage material 2 are made of strongly correlated electron material, an amount of heat storage in the composite heat storage material 1 can be increased. The inorganic material 3 and the heat storage material 2 are made of strongly correlated electron materials having phase transition temperature different from each other. Accordingly, a temperature range where the inorganic material 3 stores and dissipates heat is different from a temperature range where the heat storage material 2 stores and dissipates heat. Therefore, the composite heat storage material 1 is capable of storing and dissipating heat in a broad temperature range. The same effects as the first embodiment can be obtained by the present embodiment.

While the present disclosure has been described with reference to embodiments thereof, it is to be understood that the disclosure is not limited to the embodiments and constructions. The present disclosure is intended to cover various modification and equivalent arrangements. In addition, while various combinations and configurations are shown in the present disclosure, other combinations and configurations, including more, less or only a single element, are also within the spirit and scope of the present disclosure.

The invention claimed is:

1. A composite heat storage material comprising:
a heat storage material made of a strongly correlated electron material that stores and dissipates heat via solid-solid phase transition, the heat storage material includes particles having an approximately spherical particulate shape and the particles contain an air space; and
a primary member made of an inorganic material different from the heat storage material, wherein
the heat storage material is mixed and dispersed approximately uniformly in the primary member.

2. The composite heat storage material according to claim 1, wherein the heat storage material is made of a material that exhibits metal-insulator transition.

3. The composite heat storage material according to claim 1, wherein the inorganic material of the primary member is made of the strongly correlated electron material that stores and dissipates heat via solid-solid phase transition.

4. The composite heat storage material according to claim 1, wherein an air space is provided in the primary member.

5. The composite heat material according to claim 1, wherein the heat storage material has a diameter of approximately 10 mm.

6. The composite heat material according to claim 1, wherein the primary member has a honeycomb structure.

7. The composite heat material according to claim 6, wherein the honeycomb structure has a circular column shape including a plurality of cell walls and a plurality of cell holes encompassed by the cell walls, and the cell holes penetrating the honeycomb structure in an axial direction.

8. The composite heat material according to claim 6, wherein the honeycomb structure is contained within an exhaust gas pipe in which exhaust vehicle gas flows.

9. The composite heat material according to claim 1, wherein the inorganic material of the primary member is ceramic material selected from the group consisting of aluminum oxide, aluminum nitride, and silicon nitride.

10. The composite heat material according to claim 1, wherein the heat storage material is a member selected from the group consisting of $VO_2$, $V_2O_3$, $NaNiO_2$, $PrBaCo_2O_{5.5}$, $DyBaCo_2O_{5.5}$, $LiMn_2O_4$, $HoBaFe_2O_5$, $DyBaFe_2O_5$, $GdBaFe_2O_5$, $EuBaFe_2O_5$, $SmBaFe_2O_5$, $TbBaFe_2O_5$, $LiRh_2O_2$, $VO_2$ doped with W, Nb, Ta or Mo, and $V_2O_3$ doped with W, Nb, Ta or Mo.

11. A composite heat storage material comprising:
a heat storage material made of a strongly correlated electron material that stores and dissipates heat via solid-solid phase transition, the heat storage material having an approximately spherical particulate shape; and
a primary member made of an inorganic material different from the heat storage material, wherein
the heat storage material is mixed and dispersed in a surface of the primary member.

* * * * *